A. W. MORGAN.
STREET STOP-COCK BOX FOR GAS OR WATER.

No. 192,340. Patented June 26, 1877.

Witnesses
T. H. Parsons
J. R. Drake

A. W. Morgan
Inventor, By
J. R. Drake
Atty.

UNITED STATES PATENT OFFICE.

AMOS W. MORGAN, OF BUFFALO, NEW YORK.

IMPROVEMENT IN STREET STOP-COCK BOXES FOR GAS OR WATER.

Specification forming part of Letters Patent No. 192,340, dated June 26, 1877; application filed April 19, 1877.

*To all whom it may concern:*

Be it known that I, AMOS WILLIAMS MORGAN, of Buffalo, in the county of Erie and State of New York, have invented certain Improvements in Street Stop-Cock Boxes, and Pipes for Gas or Water, of which the following is a specification:

This invention relates to an improvement in fastening the cover to street-boxes used to turn on or off water or gas; also, to an improvement in the lower part of the pipe, which sets over the conducting-pipe; and the invention consists in casting on the inside of the top of the pipe or box a lug or projection, through which a (brass) screw is put, in connection with the cap or box-cover, and by which the cover is screwed down tight to the pipe, or swung round so that the rod inside of the pipe can be got at to turn on or off the water or gas; the object being to prevent the top from being lost or the water got at except by authorized persons.

It further consists in casting a flange around the semicircular openings in the sides of the pipe, which set over the usual connecting-pipe, and also in providing a base to the pipe, as hereinafter more particularly described.

Figure 1:
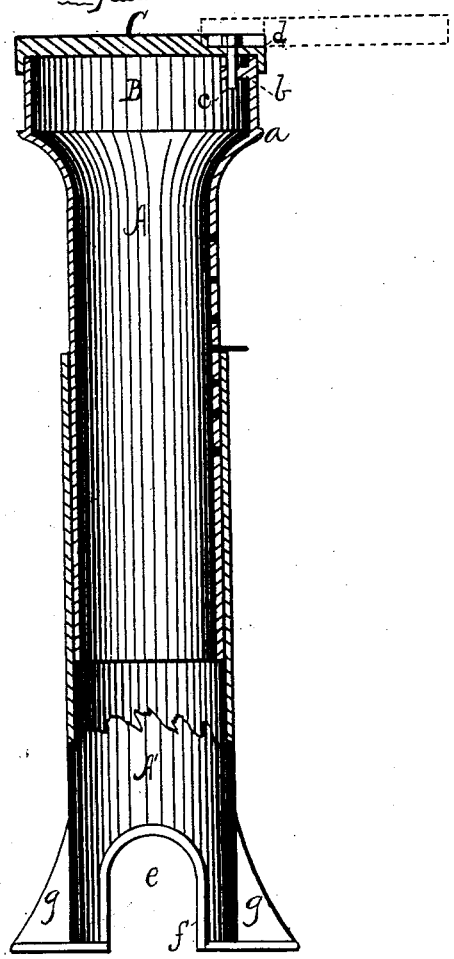
Figure 2:
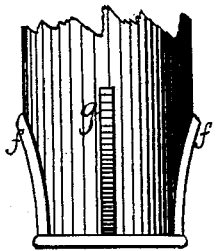

In the drawings, Figure 1 is an elevation partly in cross-section; Fig. 2, portion of the bottom or lower pipe, showing the flanges.

A represents the upper pipe, and A' the lower pipe. This is made in two parts, one telescoping into the other, so as to graduate the length to the different depths at which the pipes are sunk; but when they are laid at a uniform depth one pipe, A, will be sufficient.

As shown, the pipe A sets into pipe A', and is held at any height desired by a wedge or pin, as shown.

The upper part of this pipe A is made into a box, B, either round or square, with or without the shoulder or bulge a.

On the inside of this pipe or box B is cast a lug or projection, b, for the purpose of receiving and holding the brass screw c, which is set through a countersunk opening, d, in the box-cover C, and has a square or other shaped head or nut, so that it can be turned by a key or wrench. Usually the same one that will be used for turning on the water will be used.

The countersunk d, in the cover, is important, as it keeps the screw-head flush with the cover and side-walk, presenting no obstruction to those walking over it, and protects the screw.

By this screw and lug the head is swung round, as shown in dotted lines, Fig. 1, and swung back and screwed down tight, preventing the top from being removed and the pipe filled with stones, dirt, or débris, as is now frequently the case.

The lug may be cast outside, if desired, but I prefer it on the inside of the pipe. The screw c is made of brass to prevent corrosion, but iron may be used.

The lower end or bottom of the pipe A' has the usual side openings e e, which set over the lead or iron conducting-pipe. (Not shown.)

These iron pipes A A' being cast thin will, in time, cut into the conducting-pipe, its weight gradually wearing a hole or depressing and bending the pipe.

To overcome this difficulty I give additional thickness to the edge of the openings e e by casting a flange, f, around or partly around the said openings, so as to give a broader surface where the weight rests on the pipe.

To further take off the weight on the conducting-pipe, and prevent the pipe A A' from sinking into the ground by its own weight, as is often the case, I cast flanges or bases g g on the bottom or sides of said pipe. These give a foot to the pipes and prevent them sinking into the earth, mud, or sand, and are very important, as the sinking of these pipes has hitherto been a great difficulty. They aid to keep them straight also.

I claim—

1. In combination with the pipe A having the inside lug b, the cover C having the countersunk opening, and provided with the vertical brass screw for fastening the same, with the head formed to receive a wrench or key, substantially as and for the purpose specified.

2. In a stop-cock pipe, A, in combination with the pipe openings e e, the flanges or shoe g g, substantially as and for the purpose specified.

In witness whereof I have hereunto signed my name in the presence of two subscribing witnesses.

A. W. MORGAN.

Witnesses:
J. R. DRAKE,
T. H. PARSONS.